United States Patent [19]

Croyle

[11] 4,341,808
[45] Jul. 27, 1982

[54] FROZEN RAW CUSTARD

[75] Inventor: Barbara A. Croyle, Parma, Ohio

[73] Assignee: SCM Corporation, New York, N.Y.

[21] Appl. No.: 223,838

[22] Filed: Jan. 9, 1981

[51] Int. Cl.$^3$ .......................... A23L 1/04; A23L 1/32
[52] U.S. Cl. .................................... 426/573; 426/575;
426/580; 426/574; 426/614; 426/653; 426/496
[58] Field of Search ............... 426/573, 575, 614, 574,
426/653, 496

[56] References Cited

U.S. PATENT DOCUMENTS

| | | | |
|---|---|---|---|
| 3,073,704 | 1/1963 | Rivoche | 426/573 |
| 3,345,185 | 10/1967 | Pisani | 426/565 |
| 3,408,207 | 10/1968 | Katz | 426/614 |
| 3,475,180 | 10/1969 | Jones | 426/614 |
| 3,510,316 | 5/1970 | Decker | 426/565 |
| 3,721,571 | 3/1973 | Glicksman | 426/573 |
| 3,911,144 | 10/1975 | Strong et al. | 426/614 |
| 3,993,793 | 11/1976 | Finney | 426/565 |
| 4,214,010 | 7/1980 | Corbett | 426/573 |
| 4,216,242 | 8/1980 | Braverman | 426/573 |

*Primary Examiner*—Jeanette M. Hunter
*Attorney, Agent, or Firm*—Richard H. Thomas

[57] ABSTRACT

A freezable raw custard preparation, especially for quiche having a substantial proportion which is whole egg or egg white based whole egg replacer. The composition also has an effective amount of food particulates and a milk derived portion. The egg and milk derived portions are present in a weight ratio of about 0.45:1 to about 0.75:1, the milk derived portion comprising fluid milk, a water absorbing quantity of a protein concentrate, and a thixotropic gum. The total protein content from the fluid milk and protein concentrate is at least about 4% by weight of the milk derived portion. The gum content is that effective to provide a viscosity of the raw custard sufficient for homogeneous suspension of the food particulates prior to freezing.

9 Claims, No Drawings

FROZEN RAW CUSTARD

The present invention relates to a unique freezable raw custard and use of such custard in the preparation of frozen raw quiche fillings and other frozen custard fillings.

For purposes of the present application, the term "custard" is defined as a milk or milk derived composition containing a substantial whole egg portion or egg white based whole egg replacer. The custard of the present invention preferably is essentially fat-free, excluding egg fat, and is starch-free.

BACKGROUND OF THE PRESENT INVENTION

A typical custard formulation, used as a control for the present invention, comprises whole milk, eggs, flour, salt and pepper. Whether sweet or savory, it is thickened by the coagulation of the egg protein. Desirably, the custard proportion should be such as to produce a cutable texture free of gumminess or graininess.

Previous work with frozen eggs and egg products has shown that cooked egg protein is not stable to freezing and thawing. In particular, toughness and excessive syneresis is exhibited by egg custards which are cooked prior to freezing and rewarmed subsequent to being frozen. The effect of the syneresis is a tendency on the part of the end product to flatten out and release fluid on standing. Sugar in the custard composition may serve as a somewhat protective agent, and sweet custards respond better to post-bake freezing then savory ones. However, excessive weeping can still be noticed.

Freezing prior to baking results in a higher quality end product but several drawbacks still remain. Freeze-thaw cycling still tends to damage the raw egg proteins by ice crystal growth and by creating microenvironmental changes; that is, eutectic mixtures with high-electrolyte concentrations which can denature the proteins. This damage will still result in some syneresis after baking and a loss of custard strength.

In addition, conventional custard compositions do not lend themselves to continuous manufacture on automotive preparation and filling lines, particularly in the case of quiche preparations which will contain particulate solids, in addition to the custard ingredients, such as meat solids, cheese solids, vegetable solids, fruit solids, or seafood solids and the like. This is because the raw custard is too thin to suspend such solids resulting in an uneven distribution of the particulates in the end product. In addition, excessive splashing is likely to occur in mechanical filling operations.

The use of gums, including natural gums or cellulosic gums to prevent the syneresis of milk or milk derived compositions is well known. For instance, prior U.S. Pat. No. 3,721,571 to Glicksman et al describes a pudding composition which exhibits resistance to syneresis under conditions of freeze-thawing or high heat treatment. The composition comprises water, sweetening agents, fat emulsions, milk solids, starch and gums, an amount of the gum being xanthan gum. The pudding composition does not contain whole eggs. Stabilizing is accomplished by the starch/gum combination.

Prior U.S. Pat. No. 3,911,144 to Strong et al describes a liquid egg product purporting to have a higher degree of freeze-thaw stability comprising an amount of egg white, nonfat dry milk solids, and other ingredients. Here again, an amount of xanthan gum is employed to impart freeze-thaw stability to the liquid egg product. A substantial amount of the product is a vegetable fat, and the proportions of ingredients are said to be such as to produce a product which has the organoleptic characteristics of whole eggs, suitable for such applications as the preparation of baked goods. Only eggs whites are employed in the product.

U.S. Pat. No. 3,993,793 to Finney is typical of those patents employing a microcrystalline cellulose as a stabilizer for ice creams and frozen confections. The compositions do not contain a substantial egg content. Another recently issued patent in this art is U.S. Pat. No. 4,216,242 to Braverman.

Prior U.S. Pat. Nos. 3,345,185, to Pisani et al and 3,510,316, to Decker, are typical of low-fat formulations usable in the preparation of frozen desserts. The formulations do not suggest the present invention.

SUMMARY OF THE PRESENT INVENTION

The freeze-thaw drawbacks and other disadvantages of conventional custard formulations are overcome in accordance with the concepts of the present invention by providing, as a freezable raw custard preparation, a composition of which a substantial proportion is whole egg or egg white based whole egg replacer. The composition also has an effective amount of food particulates and a milk derived portion. The egg and milk derived portions are present in a weight ratio of about 0.45:1 to about 0.75:1, the milk derived portion comprising fluid milk, a water absorbing quantity of a protein concentrate, and a thixotropic gum. The total protein content (by Kjeldahl analysis) from the fluid milk and protein concentrate is at least about 4% by weight of the milk derived portion. The gum content is that effective to provide a viscosity of the raw custard sufficient for homogeneous suspension of the food particulates prior to freezing.

Preferably, the fluid milk is formulated from water and nonfat dry milk solids to provide a solids content comparable with fluid milk.

Preferably, the milk derived portion consists essentially of about 82–84% water; about 8–10% nonfat dry milk solids; about 4.5–8.0% water absorbing bland protein concentrate, about 0.5–1.75% thixotropic gum, and effective amounts of flavors and seasoning components.

Preferred embodiments are those wherein the water absorbing protein is a whey protein concentrate and the gum is a thixotropic cellulosic derivative. A water dispersible microcrystalline cellulose is a preferred gum.

Following freezing and then cooking, for instance by baking, the product of the present invention exhibited the texture, flavor and appearance of unfrozen baked egg custard. After at least four freeze-thaw cycles, the product showed no discernable significant weeping.

An advantage of the present invention is that the custard base is readily adaptable to a number of different quiche formulations, for instance a Quiche Lorraine, Quiche Alpine, Quiche Napoli, and Quiche Francais. The food particulates can be, by way of example, meat solids, cheese solids, vegetable solids, fruit solids, seafood solids, and combinations thereof.

After an extended period of time, for instance nine months, at 0° F. or below, all products were judged acceptable. At the same time, the custard compositions were readily adapted for use with automatic processing and filling lines, and had a uniform distribution of particulate matter therein.

DETAILED DESCRIPTION OF THE PRESENT INVENTION AND EXAMPLES

In practice of the present invention, the microcrystalline cellulose and water are first intensively mixed using a high-speed mixer, and this mixture along with other liquid ingredients such as liquid flavorants (e.g., wine, tomato sauce) and excluding the eggs, are then placed in a suitable mixer, for instance a Hobart mixer. Other water dispersible liquid flavorants or colorants can be added at this point. The dry ingredients, namely the non-fat dry milk, protein concentrate, and any dry flavor and seasoning ingredients are then added to the liquid mixture in the mixer, and the combination is mixed thoroughly. Completely thawed, frozen whole eggs or egg white based whole egg replacer are then added to the above mixture and blending is continued for an additional short period of time. At this point, or after the blending of the dry ingredients, the food particulates, for instance meat particulate, vegetable particulate, cheese particulate, fruit or seafood particulate, or the like, can be added. The entire mixture is then dispensed into an unbaked pie shell, which is in turn in a suitable container, is covered, and then frozen. For consumption, the frozen quiche is baked at about 375° F. for about 60 minutes.

Following mixing, but prior to freezing, the products of the present invention have a viscous consistency or viscosity sufficient for homogeneous suspension of particulate solids therein, and to prevent splashing in automatic dispensing apparatus. Effective results are obtained with a viscosity in the range of about 3,000 to about 5,000 centipoises as determined on a Brookfield Rotational Viscometer, Model LVF, taken after one minute using spindle No. 2 at a speed of 30 rpm (at 70° F.).

The custard portion of the products of the present invention was also tested for syneresis before and after freeze-thaw cycling, for baked custard gel strength before and after cycling, and for organoleptic evaluation of appearance, mouthfeel and flavor relative to a conventional custard control. Syneresis was measured by allowing the baked custards to cool for 15 minutes, inverting them on a screen (ASTM No. 40), and weighing the amount of fluid accumulated beneath the screen after one hour. Samples were covered to prevent evaporative loss. To evaluate gel strength, baked custards were cooled and the surface skins were carefully removed. A Precision Scientific Bloom Gelometer is used to determine the weight of lead shot necessary to propel a gelatin testing plunger 4 mm into the surface of the custard.

In all cases, the custard products of the present invention showed no significant, ascertainable syneresis, exhibited excellent gel strength and excellent organoleptic characteristics (appearance, mouthfeel and flavor) relative to a control. Again, control is a standard custard made from eggs, milk, flour, salt and pepper.

Preferably the custard preparation of the present invention employs whole eggs. A replacer for whole eggs can be used but should be egg white based. A number of such replacers are marketed commercially, such as Creme-o-fluff (Trademark, Holton Food Products Co.), which is essentially fat-free. Another such replacer is that disclosed in Strong et al U.S. Pat. No. 3,911,144, which is egg white based and contains a vegetable oil and anti-oxidant for stability.

The use of non-fat milk solids in the composition of the present invention is important to prevent rancidity of the product due to instability of milk fat during the freezing period. In this regard, the composition of the present invention preferably is essentially fat-free (exclusive of the eggs) and preferably contains no vegetable fat. The non-fat dry milk solids, when added to water, provides a milk replacer and is the primary dairy ingredient of the present invention. By "fat-free", it is meant that the only fat in the present formulation is that incidentally present in the non-fat dry milk solids or other ingredients, e.g., eggs, in the formulation. Skim milk may be employed as the primary dairy ingredient in place of non-fat dry milk solids. In such case, the water content would have to be appropriately adjusted or eliminated. Alternatively, a casein derivative such as sodium or calcium caseinate can be employed, on a protein equivalency, as the milk solids.

Quiche products in accordance with the present invention have been successfully made employing whole milk to provide the milk solids. The whole milk is used at a level to provide a protein content equivalent to that of non-fat milk solids in the above formulation. However, an amount of antioxident is required to prevent rancidity over long storage. Whole milk provides a richer mouthfeel which may or may not be preferred. One can also employ a dairy product such as half-and-half or cream as a part of the dairy portion or, alternatively, a non-dairy coffee creamer. One suitable creamer is Coffee Rich, (Trademark Rich's Products). Another is Coffeemate, (Trademark Carnation Company), having a label declaration including corn syrup solids, partially hydrogenated coconut oil, sodium caseinate, and mono- and diglycerides. With the use of fat containing milk products, adjustment of the amount of gum employed may be necessary. For instance, with use of whole milk, the microcrystalline cellulose may be used at a level up to about $2\frac{1}{4}\%$ based on the weight of the composition milk portion. The microcrystalline cellulose may, in such case, advantageously be supplemented with use of a small amount of another gum, such as carrageenan.

For purposes of the present application, the term "fluid milk" when used herein shall include natural milk, skim milk and reconstituted milk from milk derived solids (e.g., non-fat dry milk solids and water).

The gum stabilizer can broadly be any thixotropic gum which is compatible with the egg structure of the present formulation, in the sense that the gum gel has a similar strength and mouthfeel to that of egg protein, and which is capable of hindering breakdown of the egg protein structure (capable of inhibiting ice crystal growth). The gum stabilizer also aids in suspension of the particulate solids.

A preferred such gum is a medium to high viscosity, microcrystalline cellulose. Other cellulose derivatives which may be employed in the present invention and are thixotropic are methylcellulose, carboxymethylcellulose, hydroxypropylmethylcellulose, and sodium carboxymethylcellulose.

Microcrystalline cellulose is a well-known industrial product, and is frequently used in low-calorie ice creams at relatively high levels. To make it readily dispersible, it is sold combined with sodium carboxymethylcellulose under the Trademark Avicel, such as Avicel RC-591 (FMC Corporation) and Avicel CL 611. These compositions are stated to be colloidal forms of microcrystalline cellulose which have been blended with sodium carboxymethylcellulose and dried. In Avicel RC-591, the amount of sodium carboxymethylcellulose is about 11%±1% by weight of the microcrystalline cellulose.

Other gums which may be used alone or in combination with the cellulosic derivatives, to provide thixotropy and meet the other requirements listed above, are plant extracts such as acacia gum and karaya gum; marine plant extracts such as algin and carrageenan; seed extracts such as guar gum and fruit extracts such as pectin.

The water-absorbing protein concentrate of the present invention preferably is compatible in flavor with the dairy system. A preferred such protein concentrate is whey protein concentrate which is milk derived and in this respect useful as a supplementary dairy component. A particularly preferred such protein concentrate is HiSorb (Trademark), a milk protein marketed by Stauffer Chemical Co. It is a partially delactosed nonfat dry milk which is capable of absorbing large amounts of water. These whey solids also set to an egg-protein like gel on heating, thereby augmenting the structure of the primary structural ingredient (eggs). Although the protein concentrate preferably is bland in flavor, so as to not adversely affect the flavor of the end product, this not is necessary if certain masking flavors are present. Examples of other water-absorbing protein concentrates that can be used are soy protein concentrate, soy protein isolate, whey soy protein blends, fish protein concentrate, and egg albumin.

Starch is a well-known water absorbing food additive, but its use in the present invention adds a starchy undesirable texture to the final product. It is an aspect of the present invention that the formulation thereof is starch-free.

The proportions of ingredients employed can be widely varied. For instance, the amount of non-fat dry milk solids (or skim milk, whole milk, caseinate, etc.) and water absorbing protein concentrate may be varied in level to provide a total protein content (by Kjeldahl analysis) of at least about 4% by weight of the milk derived portion. The amount of milk solids present, whether from liquid milk or reconstituted from milk derived solids, should be sufficient to provide the desired level of milk flavor in the end product. Generally, at least about 8% milk solids is a flavoring amount necessary in the milk derived portion to get a milk flavor.

Milk solids are about 35% protein, the remainder being primarily ash and carbohydrate. Thus, 8% milk solids contributes about 2.8% protein to the milk derived portion. If a soy caseinate protein concentrate is used as the concentrate, it may have a protein content as low as about 30%. Generally, at least about 4.5% concentrate is necessary to obtain the water absorption required. Soy caseinate at a level of about 4.5% will thus provide at least about 1.35% protein, giving a total protein content of more than 4%. Soy protein isolate can be about 90% protein, giving an even higher total protein content.

The amounts of flavoring, seasoning, colorants and food particulates added should be those necessary to obtain the organoleptic characteristics required, particularly appearance, flavor and texture. Amounts of sugar or other such carbohydrate may be employed as needed or desired.

Sweetening agents, in addition to sucrose which may be employed in the custards of the present invention, include dextrose, lactose, fructose, corn syrup solids, and similar carbohydrates added to a sweetness level desired. Functionally, particularly with the use of such sweetening agents as corn syrup solids, the sweetening agents may desirably add some stability to the end product. Low-calorie custards may also be prepared by employing synthetic sweetening agents preferably in combination with a low-bulk density carbohydrate filler (such as Avicel PH-101, Trademark FMC Corporation).

The following examples are illustrative of the present invention. The formulas below were employed to produce manufactured frozen quiche fillings.

EXAMPLE I

Quiche Lorraine Filling

| Milk Portion: 43% | |
|---|---|
| Water | 83.0 |
| Nonfat dry milk | 9.5 |
| Water absorbing protein concentrate[1] | 5.5 |
| Gum stabilizer[2] | 1.0 |
| Seasonings | balance |
| Liquid Whole Eggs: 23% | |
| Food Particulate: 34% | |
| Cooked bacon | 23.5 |
| Chopped cheeses | 76.5 |

[1]HiSorb Concentrate, Stauffer Chemical Co.
[2]Avicel RC-591, FMC Corporation

EXAMPLE II

Quiche Francais Filling

Example II is substantially the same as Example I, except that the milk portion contains 74% water and 9% white wine. Also, the amount of milk portion is reduced to about 34%, while the egg portion becomes 19% and the food particulate 47%. The food particulate is characterized by roughly 44% cheese, 26% cut asparagus and 30% crab meat.

The above formulations were prepared by hydrating the gum stabilizer in the water fraction using a high-shear mixer. The remaining solids in the milk portion were then added and mixed thoroughly. In Example II, the wine was added at this point. Next, the food particulate portion was dispersed in the mix. The eggs were added and mixed as a final step. Fillings were held under refrigeration until use. Measured amounts of the finished, homogeneous fillings were mechanically deposited into previously prepared pie crusts in appropriate containers. Quiches were frozen in a blast freezer to an internal temperature of −10° F., and packaged.

The above quiche were tested for performance (custard strength, stability, and particulate distribution) and organoleptic characteristics (flavor, mouthfeel, and appearance) against a control product (a nonfrozen cookbook quiche formulation subjected to conventional preparation and baking procedures). In organoleptic attributes, the example quiche compared favorably with the standard. In performance characteristics, the example products were superior to the control in all respects. Freeze-thaw testing showed the products described above to be stable (exhibit no appreciable syneresis) after four freeze-thaw cycles.

What is claimed is:

1. A frozen, uncooked raw custard preparation, a substantial proportion of which is whole egg or egg white based whole egg replacer, capable of withstanding freeze-thaw cycling, and capable of homogeneous suspension of food particulates prior to freezing, comprising (1) an organoleptically effective amount of said food particulates;
(2) uncooked, whole egg or egg white based whole egg replacer; and
(3) a milk-derived portion wherein said egg and milk-derived portion are present in the weight ratio of about 0.45:1 to about 0.75:1;

the milk derived portion comprising fluid milk, a thixotropic gum, and a water-absorbing quantity of a protein concentrate, in proportion to provide with said whole eggs or egg replacer a viscosity sufficient for homogeneous suspension of said food particulates prior to freezing, the protein content by Kjeldahl analysis from the fluid milk and protein concentrate being at least about 4% by weight of the milk derived portion.

2. The custard preparation of claim 1, wherein said milk-derived portion comprises about 82–84% water, about 8–10% non-fat dry milk, about 4.5–8% of a water-absorbing, bland protein concentrate, and about 0.5–1.75% of a thixotropic gum.

3. The custard preparation of claim 2, wherein said gum is microcrystalline cellulose.

4. The custard preparation of claim 3, wherein said water-absorbing protein concentrate is whey protein concentrate.

5. The custard preparation of claim 1 which is essentially fat-free and starch-free.

6. The custard preparation of claim 5, having a viscosity prior to freezing in the range of about 3000 to about 5000 centipises as determined on a Brookfield Rotational Viscometer, Model LVF, at one minute, 70° F., with a No. 2 spindle and 30 R.P.M.

7. A frozen quiche formulation comprising the raw custard preparation of any of claims 1 through 6.

8. A frozen, uncooked, egg-based raw custard preparation, capable of withstanding freeze-thaw cycling and capable of homogeneous suspension of food particulates prior to freezing, comprising (1) an organoleptically effective amount of said food particulates;
(2) uncooked, whole egg or egg-white based whole egg replacer;
(3) a milk-derived portion, items (2) and (3) being in relative amounts to yield on cooking a custard-like consistency;

the milk-derived portion comprising
(a) a thixotropic gum thickening agent;
(b) a protein concentrate; and
(c) fluid milk, the amount of gum thickening agent being sufficient with other ingredients of the formulation to achieve suspension of the food particulates in the formulation prior to freezing.

9. The custard preparation of claim 8 wherein said fluid milk is present in a flavoring amount.

* * * * *